United States Patent
Christopherson, Jr. et al.

(10) Patent No.: US 8,962,147 B2
(45) Date of Patent: Feb. 24, 2015

(54) POWDER METAL COMPONENT IMPREGNATED WITH CERIA AND/OR YTTRIA AND METHOD OF MANUFACTURE

(75) Inventors: Denis Christopherson, Jr., Waupun, WI (US); Jeremy Koth, Sun Prairie, WI (US)

(73) Assignee: Federal-Mogul Corporation, Southfield, MI (US)

( * ) Notice: Subject to any disclaimer, the term of this patent is extended or adjusted under 35 U.S.C. 154(b) by 255 days.

(21) Appl. No.: 13/311,123

(22) Filed: Dec. 5, 2011

(65) Prior Publication Data

US 2012/0141811 A1    Jun. 7, 2012

Related U.S. Application Data

(60) Provisional application No. 61/419,522, filed on Dec. 3, 2010.

(51) Int. Cl.
| | | |
|---|---|---|
| *H01F 3/00* | (2006.01) | |
| *B32B 5/18* | (2006.01) | |
| *B32B 5/14* | (2006.01) | |
| *B32B 5/22* | (2006.01) | |
| *F16C 33/12* | (2006.01) | |

(Continued)

(52) U.S. Cl.
CPC .............. *B22F 1/0018* (2013.01); *B22F 3/1146* (2013.01); *B22F 3/26* (2013.01); *C22C 1/0475* (2013.01); *C22C 33/0242* (2013.01); *C22C 38/18* (2013.01); *B32B 9/04* (2013.01); *B32B 15/02* (2013.01); *B32B 15/04* (2013.01); *B22F 3/12* (2013.01); *B32B 2264/102* (2013.01)
USPC ........ 428/566; 428/613; 428/614; 428/307.7; 428/308.4; 428/312.8; 428/317.9; 508/103; 508/108; 419/27

(58) Field of Classification Search
None
See application file for complete search history.

(56) References Cited

U.S. PATENT DOCUMENTS

| 3,622,234 A | 11/1971 | Seybolt et al. |
| 3,775,823 A | 12/1973 | Adolph et al. |

(Continued)

FOREIGN PATENT DOCUMENTS

| CN | 1329527 A | 1/2002 |
| EP | 1850411 | 10/2007 |

(Continued)

OTHER PUBLICATIONS

International search report PCT/US2011/063276 mailed on Mar. 12, 2013.

*Primary Examiner* — Gwendolyn Blackwell
*Assistant Examiner* — Seth Dumbris
(74) *Attorney, Agent, or Firm* — Robert L. Stearns; Dickinson Wright, PLLC

(57) ABSTRACT

A powder metal component is made of compacted and sintered powder metal particles such as chromium-containing ferrous-based metal and is porous. Following sintering, the pores are impregnated with relatively smaller particles of ceria and/or yttria. The component is then heat treated and the presence of the impregnated ceria and/or yttria serve as nucleation sites for the formation of desirable oxides, such as chromium oxide, on the surface. The impregnated particles that lie below the protective oxide layer remain available throughout the life of the component in the event the original oxide layer becomes worn or damaged, wherein a renewed protective oxide is formed in such regions due to the presence of the impregnated particles.

12 Claims, 2 Drawing Sheets

(51) Int. Cl.
    *B22F 3/26*      (2006.01)
    *B22F 1/00*      (2006.01)
    *B22F 3/11*      (2006.01)
    *C22C 1/04*      (2006.01)
    *C22C 33/02*     (2006.01)
    *C22C 38/18*     (2006.01)
    *B32B 9/04*      (2006.01)
    *B32B 15/02*     (2006.01)
    *B32B 15/04*     (2006.01)
    *B22F 3/12*      (2006.01)

(56) References Cited

U.S. PATENT DOCUMENTS

| | | | |
|---|---|---|---|
| 3,778,249 A | 12/1973 | Benjamin | |
| 3,926,691 A | 12/1975 | Fustukian et al. | |
| 4,619,699 A | 10/1986 | Petkovic-Luton | |
| 4,631,082 A | 12/1986 | Andrews | |
| 5,273,569 A | 12/1993 | Gilman | |
| 5,588,477 A | 12/1996 | Sokol et al. | |
| 5,590,392 A | 12/1996 | Ishiwata et al. | |
| 5,679,041 A | 10/1997 | Sokol et al. | |
| 5,868,876 A | 2/1999 | Bianco | |
| 5,964,928 A * | 10/1999 | Tomlinson | 106/14.21 |
| 6,102,979 A | 8/2000 | Bianco | |
| 6,254,660 B1 | 7/2001 | Bernard | |
| 7,531,021 B2 | 5/2009 | Woodfield | |
| 2003/0144155 A1 | 7/2003 | Tenne et al. | |
| 2006/0035087 A1* | 2/2006 | Yadav et al. | 428/411.1 |
| 2009/0042751 A1* | 2/2009 | Narayan | 508/155 |
| 2009/0061272 A1* | 3/2009 | Blennow et al. | 429/27 |
| 2009/0274941 A1* | 11/2009 | Yamada et al. | 429/30 |
| 2009/0298683 A1 | 12/2009 | Lomello-Tafin | |

FOREIGN PATENT DOCUMENTS

| | | | | |
|---|---|---|---|---|
| WO | WO2006/138070 | * | 12/2006 | H01M 8/02 |
| WO | WO2008/003976 | * | 1/2008 | H01M 8/02 |

* cited by examiner

POWDER METAL COMPONENT IMPREGNATED WITH CERIA AND/OR YTTRIA AND METHOD OF MANUFACTURE

This application claims priority to U.S. Application Ser. No. 61/419,522, filed Dec. 3, 2010, and is incorporated herein by reference.

TECHNICAL FIELD

This invention relates generally to the manufacture of powder metal (PM) components, and to the impregnation of the pores of such PM components with another material.

BACKGROUND OF THE INVENTION

Powder metal (PM) components are made by mixing a desired powder composition (either prealloyed, admixed or both), compacting the powder mix into a green compact and then sintering the green compact to yield a sintered PM component.

It is known to impregnate the pores of PM components following sintering with resin or oil.

It is known to coat the surface of chromium-containing, ferrous-based wrought materials with a thin layer of nanoceria, which serves as a reactive catalyst when exposed to a high temperature or aqueous oxidizing environment to yield protective chromium oxide at the surface. While beneficial, if the protective chromium oxide layer becomes worn or damaged, the underlying substrate material can become exposed and undesirable oxides, such as $Fe_2O_3$ and FeO, can form, and so use nanoceria offers limited protection.

SUMMARY OF THE INVENTION

A powder metal component is fabricated of a compacted and sintered particulate material with a predetermined amount of porosity. The PM component is impregnated with particles of cerium and/or yttria.

A method of making a PM component includes impregnating a compacted and sintered PM component with ceria and/or yttria.

During a subsequent heat treatment processes, the impregnated ceria and/or yttria provides nucleation sites for protective oxides to form. For example, when chromium is present in the PM material, it can react favorably with the impregnated particles of ceria and/or yttria to form chromium oxide, while also serving to inhibit the formation of undesirable oxides such as iron oxide when iron is present as well. Other chromium oxide compounds can also form, as can other protective oxides including protective oxides in the presence of other alloy elements, such as oxides of vanadium, tungsten, molybdenum, and aluminum to name a few.

A further benefit is realized by impregnating the PM component with particles of ceria and/or yttria even after the initial protective oxide layer forms on the outer surface of the component. The impregnated particles that reside in the pores beneath the protective oxide layer are available for the continued formation of protective oxide in the event that the original protective oxide layer becomes worn or damaged, and as such the retained ceria and/or yttria within the pores provide the PM component with a regenerating or self-healing protective oxide, unlike such coatings on non-PM components. As such, impregnation with ceria and/or yttria provides an immediate beneficial effect during heat treatment and then a lasting effect of corrosion resistance over the life of the component.

The ceria and/or yttria can be incorporated into a carrier such as oil, water or other liquids, or even incorporated into a resin as part of the impregnation process. Using oil, for example, would have the benefit of providing oil impregnation with its known benefits (e.g., self-lubricating properties), but when laced with ceria and/or yttria the combination has the added benefit of lasting corrosion protection over the life of the PM component. The carrier (oil or water) also may increase the mobility of the impregnated particles and thereby enhance their effectiveness. Moreover, the same impregnation techniques and equipment currently used with oil impregnation can still be advantageously used when incorporating the particles into the oil as the carrier, and thus the only cost addition is that of the extra particle impregnation material.

The impregnated ceria and/or yttria particles are relatively smaller in size than that of the pores of the PM part. It is advantageous that the impregnated particles be selected as nano-particles for good distribution, coverage and effectiveness in serving as nucleation sites for the formation of the protective oxide layer.

These and other features and advantages of this invention will become more apparent to those skilled in the art from the detailed description of a preferred embodiment. The drawings that accompany the detailed description are described below.

DETAILED DESCRIPTION

Figure 1:
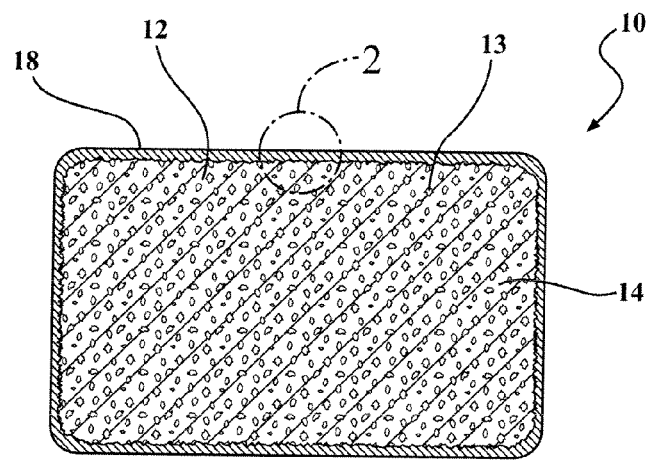
FIG. 1 is a schematic illustration of an impregnated powder metal component prepared according to the present invention.
Figure 2:
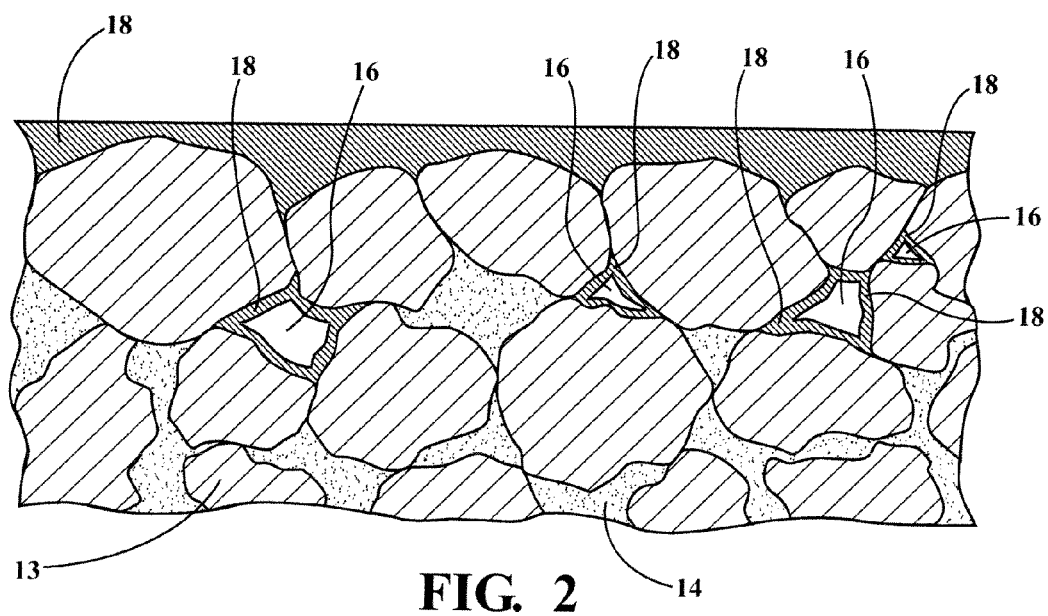
FIG. 2 is a schematically illustrated enlarged region 2 of FIG. 1.

Powder metal (PM) components are impregnated with particles of ceria ($CeO_2$) and/or yttria ($Y_2O_3$) that are smaller than the porosity of the PM components. The exposed surface of the component is also coated with the ceria and/or yttria during the impregnation process. During subsequent heat treatment, the impregnated particles, at least at or near the surface of the PM component, are reactive to provide nucleation sites for protective oxides to form at least at the surface, such as chromium-oxide, while serving to limit the formation of certain undesirable oxides, such as $Fe_2O_3$. By impregnating the PM components with such oxide catalyst particles (as opposed to simply coating the component, for example), the fraction of the impregnated particles which are not reacted during heat treatment remain in the pores of the component beneath the protective oxide layer and ready for activation at a later time over the service life of the component for the continued formation of protective oxides (e.g., chromium oxide) in the event that the original protective oxide layer is worn or damaged. During such an event, the impregnated ceria and/or yttria in the vicinity of the exposed worn or damaged coating area can mobilize to such regions to quickly reform the protective oxide skin in such areas. The mobility is particularly helped when the impregnated particles are in a fluid carrier, such as oil. As such, the impregnation with these particles provides a lasting, self-healing effect of corrosion resistance that cannot be achieved by simply coating the surface of a non-powder metal article with ceria, for example A representative PM component 10 is schematically illustrated in FIG. 1 and it will be understood that such PM component 10 can be of any size, shape or form and is made up of a plurality of powder metal particles 13 that have been compacted to provide the component with the desired shape and then sintered to bond the metal particles 13 to one another. Such a PM component 10 will have one or more exposed surfaces 12 and, by nature of the component being manufactured by powder metal techniques, will have a certain amount of porosity both at the surface and throughout the body of the component (i.e., a network of interstices that exist between the compacted and sintered metal particles that make up the PM component). Pore size is dependent upon compacting, material, density, sintering, alloy, additives, etc. The impregnated particles 14 will be sized and selected accordingly based on the particular characteristics of the PM component so that effective impregnation of the particles is achieved. The impregnation process is carried out after sintering the PM component and so the impregnated ceria and/or yttrium particles 14 are not sintered and thus are not bonded to one another or to the metal particles 13 of the PM component 10. The size of the impregnated particles may vary so long as they are relatively small and can infiltrate the pores 16 of the PM component. The impregnated particles 14 can all be of one size, or particles of different sizes may be mixed to achieve a range of sizes as desired. The impregnated particles 14 may be entirely cerium, entirely yttrium or a blend of the two and with or without the addition of other particles, including other reactive metal oxide particles and fillers. The protective oxide 18 that forms based on the presence of cerium and/or yttrium particles as nucleation sites is schematically illustrated at 18 in FIGS. 1 and 2. The protective oxide layer 18 will be at the exposed surfaces 12 and may also be present in at least some of the internal pores 16, as illustrated in FIG. 2, to the extent the conditions are such that protective oxide is favored to form in the pores (e.g., exposure of the pores to an oxidizing environment).

Figure 3:
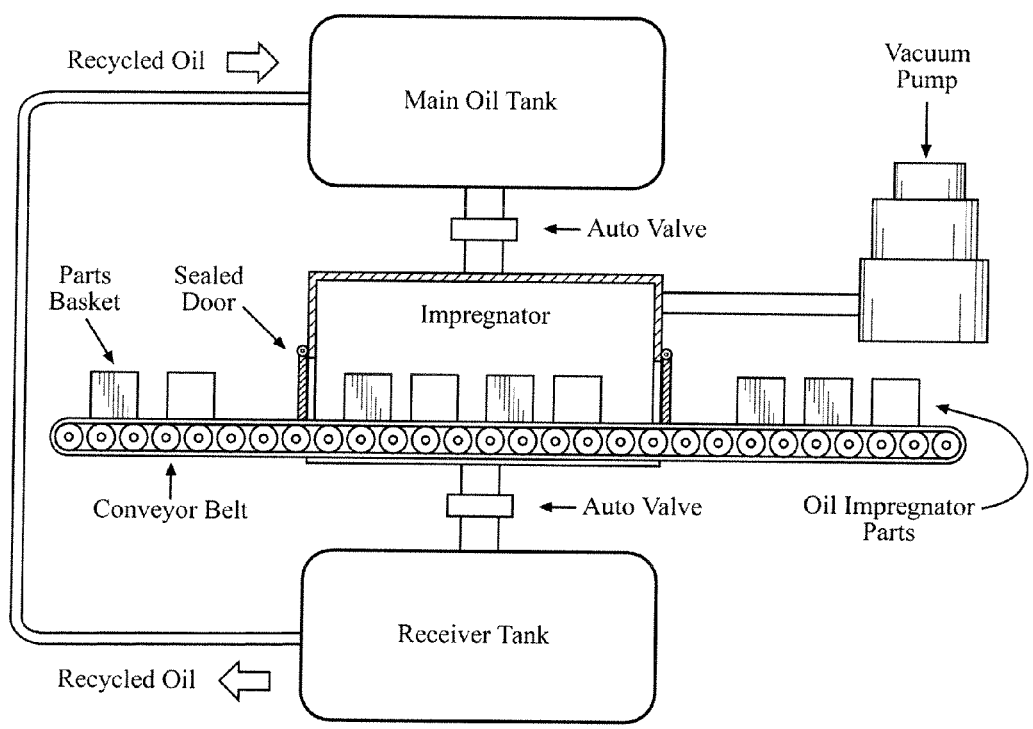
FIG. 3 is a schematic of the PM impregnating process.

The impregnation of the PM components 10 with the particles can be carried out in various ways, including using oil as a carrier for the particles. Such a process is illustrated in FIG. 3, where PM components are introduced to a vacuum environment where air is drawn out of the pores while oil and the ceria and/or yttria particles carried in the oil are drawn in to the pores and also coating the exposed surfaces of the component. Water or other medium, such as a resin, could also be employed instead of oil. Using oil has the beneficial effect of providing oil impregnation with known benefits (e.g, self lubricating bearing surfaces), but laced with the particles to provide lasting corrosion protection over the life of the component. Moreover, as the surface of the PM component wears and exposes the underlying material, the impregnated particles captured in the pores can come to the surface and react favorably to form and replenish the protective oxide coatings where they are needed at the surface for lasting protection, even under wear conditions. This benefit can only be achieved through use of PM components and with impregnation of the nano-particles. It should also be noted that the impregnating process can be carried out in one or several stages. For example there could be a first stage impregnating of the component with the particles and optional carrier (e.g., water) followed by a heat treatment where some or all of the carrier is boiled off. This can be followed by at least a second stage impregnating operation where a carrier, such as oil, can be impregnated into the pores to either serve as the only carrier that would then remain with the component over an extended period, or to replenish the carrier that was boiled off in the prior heat treatment operation.

A further benefit of impregnating the PM component 10 with the particles is that the protective oxide coating 18 that forms as a result of the presence of the particles is present not only on the outer surface of the component, but may also extend further into the pores of the component if exposed to an oxidizing environment wherein the particles in the vicinity will react in the same way as if they are on the surfaces by serving as catalysts for the formation of favorable, protective oxides and shielding against the formation of undesirable oxides. This is unlike non-PM components where only the outer surface can be coated with such a particle layer that does not penetrate the surface.

The material 13 used for the PM component can vary. One exemplary embodiment utilizes ferrous based powder metal material 13 containing at least chromium (e.g., stainless steel or tool steel powders), which react favorably in the presence of ceria and/or yttria upon heat treating through the formation of protective chromium oxide coating. Other alloys, prealloys and admixes that would benefit from impregnation of such particles are contemplated by the present invention and are embodied within the scope of the disclosure. For example, when chromium is present as an alloy element, various compounds of chromium oxide can form. Examples of other protective oxides that can form in the presence of the ceria and/or yttria include oxides of vanadium, tungsten, molybdenum, and aluminum to name a few, when those elements are included as an alloy element. Compounds of these various protective oxides can form as well.

There is no limit on the particular size of the particles 14, so long as they are no larger than the pore size 16 and are able to be impregnated in the particular PM component to be treated with the ceria and/or yttria material. For example, the nominal size of the ceria and/or yttria particles 14 may range from 1 nm to 250 microns, and more preferably from 1 nm to 100 nm, while the pores 16 may range in nominal size from 1 micron to 250 microns. The size of the particles may be uniform, or it may be beneficial to have a range of sizes. The ceria and/or yttria particles may be used alone or may be combined with other particles either as a filler or as functional particles (e.g., other oxide catalysts or fillers).

The foregoing description is exemplary rather than limiting in nature. Variations and modifications to the disclosed embodiment may become apparent to those skilled in the art are herein incorporated within the scope of the invention. The invention is defined by the appended claims.

What is claimed is:

1. A powder metal component, comprising:
   metal powder particles that are ferrous-based and include at least one of the following elements as a constituent: chromium, vanadium, tungsten, molybdenum, and aluminum;
   the metal powder particles being compacted and sintered so that the particles are bonded together and the component is porous; and including
   unsintered particles of at least one of ceria or yttria that are in a carrier of resin or oil and impregnated within the pores of the sintered metal powder particles, and wherein the unsintered particles coat an exposed surface of the sintered component; and
   a protective layer of an oxide of the at least one constituent element of the metal powder particles formed on the exposed surface.

2. The component of claim 1, wherein the unsintered particles of at least one of ceria and yttria are nano-particles.

3. The component of claim 2 wherein the nano-particles have a nominal size ranging from 1 to 100 nm.

4. The component of claim 3 wherein the pores have a nominal size ranging from 1 to 250 microns.

5. The component of claim 1 wherein said impregnated particles are of substantially uniform size.

6. The component of claim 1 wherein said impregnated particles are of different sizes.

7. The component of claim 1 wherein said at least one constituent includes chromium.

8. The component of claim 7 wherein said component and said impregnated particles are heat treated and said protective layer is chromium oxide.

9. The component of claim 1 wherein at least some of said impregnated particles lie beneath said protective oxide layer within said pores of said component.

10. The component of claim 9 wherein said protective oxide layer is present on walls of at least some of said pores.

11. The component of claim 1, wherein said unsintered particles consist of at least one of ceria or yttria.

12. The component of claim 1 wherein said protective oxide layer is present in at least some of said pores.

* * * * *